United States Patent [19]

Hill et al.

[11] Patent Number: 4,490,766
[45] Date of Patent: Dec. 25, 1984

[54] MAGNETIC RECORDING DISK CLEANING USING CONTROLLED ACTUATOR MOTION

[75] Inventors: Murray K. Hill, San Jose; William H. McConnell, Los Altos, both of Calif.

[73] Assignee: International Business Machines Corporation, Armonk, N.Y.

[21] Appl. No.: 360,125

[22] Filed: Mar. 22, 1982

[51] Int. Cl.³ .............................................. G11B 21/04
[52] U.S. Cl. ..................................................... 360/137
[58] Field of Search .......................................... 360/137

[56] References Cited

U.S. PATENT DOCUMENTS

| | | | |
|---|---|---|---|
| 3,609,721 | 9/1971 | Meneley | 340/174 I E |
| 3,855,625 | 12/1974 | Gainier et al. | 360/103 |
| 4,167,765 | 9/1979 | Watrous | 360/103 |
| 4,190,870 | 2/1980 | Avina et al. | 360/98 |
| 4,190,872 | 2/1980 | Jones, Jr. et al. | 360/125 |
| 4,384,311 | 5/1983 | McNeil | 360/137 |

FOREIGN PATENT DOCUMENTS

| | | |
|---|---|---|
| 6789791 | 10/1966 | Belgium . |
| 0063643 | 11/1982 | European Pat. Off. . |
| 2748844 | 5/1978 | Fed. Rep. of Germany . |
| 55-84077 | 6/1980 | Japan . |
| 56-29874 | 3/1981 | Japan . |

*Primary Examiner*—Robert S. Tupper
*Attorney, Agent, or Firm*—Walter J. Madden, Jr.; Henry E. Otto, Jr.

[57] ABSTRACT

In a magnetic recording disk file employing a transducing slider which is closely spaced from the disk surface and has side rail members extending in the direction of disk motion and tapered portions at the leading edge, the disk may be cleaned of contaminant particles by moving the slider in increments from the outside disk diameter to the inside diameter, so that the particles first encounter the slider/inner side rail and are swept away, rather than first encountering the tapered portions and being wedged into the magnetic coating.

3 Claims, 5 Drawing Figures

MAGNETIC RECORDING DISK CLEANING USING CONTROLLED ACTUATOR MOTION

CROSS REFERENCE TO RELATED APPLICATION

Pending application Ser. No. 431,405, filed Sept. 30, 1982, which is a continuation-in-part application of Ser. No. 257,064, filed Apr. 24, 1981 (now abandoned), discloses the skewed mounted of an air bearing transducer-supporting slider to avoid trapping contaminant particles.

BACKGROUND OF THE INVENTION

1. Field of the Invention

This invention relates to magnetic recording disk files in which a transducer is spaced closely adjacent a rotating disk, and relates more particularly to methods for maintaining the space between the transducer and the disk surface free of contaminants and debris.

2. Description of Prior Art

In current and future magnetic disk files, the trend is toward closer and closer spacing between the disk surface and the transducer or transducers which "fly" in an air bearing relationship relative to the disk surface, this spacing now being measured in a few microinches. Such close spacing is important for improved magnetic performance of the disk file, but it does present problems if contaminant particles enter the space between the transducer and the disk surface. The presence of such particles in this space can cause problems either by producing head-to-disk interference (HDI) which can lead to catastrophic damage to the recording surface of the disk, or by becoming embedded in the magnetic recording layer. Such embedded particles can produce magnetic defects and will often later produce scratches or other damage to the slider face as a result of contact with the transducer. These problems can be particularly serious when the magnetic head employed is of the type shown and described in U.S. Pat. No. 3,855,625, assigned to the same assignee as the present application. Such a head is mounted in a slider which is provided with side rails extending in the direction of disk motion and with leading and trailing edges relative to the disk motion. The transducer element is mounted on the trailing edge of the slider and the slider is mounted on a radially movable access arm so that the transducer element and slider trailing edge are radially aligned with the center of the disk. The leading edge of the slider is provided with a taper in the side rail portions for aerodynamic purposes.

In operation, it has been found that contaminant particles on the disk which first strike this tapered portion of the slider tend to move under the tapered portion, and are often embedded in the disk coating by wedging action. Such embedding is, of course, highly undesirable because of the resulting deleterious effect on the magnetic and physical properties of the disk coating and subsequent damage to the slider itself.

SUMMARY OF THE INVENTION

In accordance with the present invention, a technique is provided for cleaning contaminant particles from a disk surface by controlled motion of the access mechanism which moves the slider. This technique takes advantage of the fact that since the trailing edge of the slider is aligned radially with the center of the disk, the leading edge of the slider is slightly skewed relative to the disk center and is slightly farther away from the disk center than the trailing edge. The slider side rail facing the disk center presents a solid surface running from the trailing edge toward the leading edge to the point where the leading edge taper begins. In most applications, the edge of this surface is nearly parallel to the disk, and is much closer to the disk surface than the tapered surface. The present method utilizes the above mentioned skew and the straight portion of the inner slider rail to provide a "sweeping" of the disk surface in increments as the slider is moved inwardly from the outside diameter (OD) to the inner diameter (ID). By selecting the increment of slider motion relative to the amount of skew of the leading edge of the slider, it can be ensured that any contaminant particle small enough to get under the taper but larger than the edge separation encountered by the slider will first strike the straight slider side rail and be dislodged and carried out of the disk area by the air flow, rather than striking the slider tapered portion and possibly becoming embedded in the disk coating.

BRIEF DESCRIPTION OF THE DRAWING

FIG. 3 and FIG. 4 are, respectively, a perspective view and a top plan view of a portion of a magnetic recording disk surface and a slider, showing the debris cleaning action of the present invention.

DESCRIPTION OF THE PREFERRED EMBODIMENT

Figure 1:
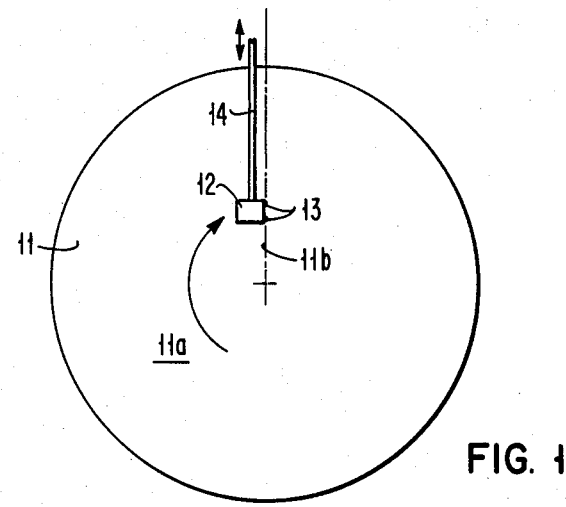
FIG. 1 is a schematic representation of a magnetic recording disk and an associated slider and transducer.

FIG. 1 schematically illustrates a magnetic recording disk 11 having a recording surface 11a over which a slider member 12 carrying a pair of transducers 13 is supported in an air bearing relationship closely adjacent surface 11a. Slider 12 may be of the type shown in U.S. Pat. No. 3,855,625, while transducers 13 may be of the type shown in U.S. Pat. No. 4,190,872. Slider 12 and transducers 13 are moved radially on surface 11a by an access mechanism shown schematically at 14. In practice, the access mechanism may be of the voice coil motor type shown in U.S. Pat. No. 4,190,870, with slider 12 mounted to the access mechanism 14 by a suspension as shown in U.S. Pat. No. 4,167,765, and only one of the transducers 13 is active. Additionally, disk 11 may be one of a number of such disks mounted in a common head-disk assembly (HDA) such as embodied in the IBM 3350, 3370, and 3380 Disk Storage units, each of the operative disk surfaces therein having an associated slider and transducer which are moved in common by the access mechanism to position the transducers over different concentric magnetic recording tracks on the disk surfaces. Such HDAs and drives have their own air filtering system to eliminate contaminants, but it has been found that these are not always totally effective.

Figures 2A, 2B:
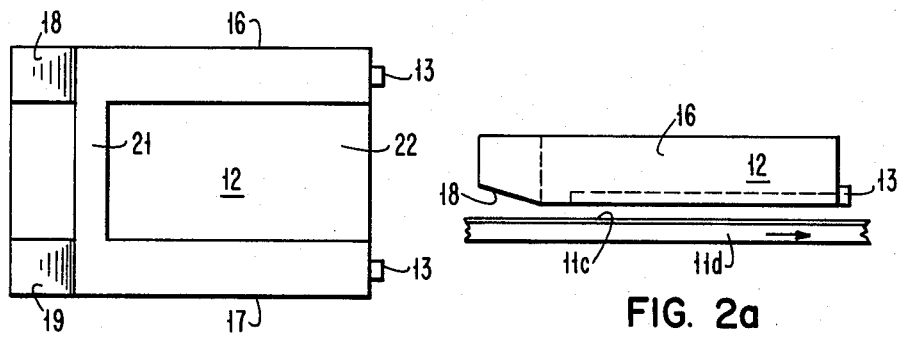
FIGS. 2a and bottom 2b are side and plan views respectively, of a slider and transducer used in practicing the invention.

The preferred embodiment of slider 12 and transducer 13 are shown in FIGS. 2a and 2b. Slider 12 is generally rectangular in shape and has a pair of side rails 16 and 17 (FIG. 2b) extending in the direction of disk motion. Transducers 13 are bonded to the trailing edge of slider 12, and as shown by broken line 11b in FIG. 1, transducers 13 and the trailing edge of slider 12 are aligned radially with the center of disk 11.

The leading edges of side rails 16, 17 terminate in tapered portions 18 and 19, respectively, for aerodynamic purposes, and it is these tapered portions which can produce the contaminant imbedding discussed above. Slider 12 also includes a leading edge cross rail 21, as shown in FIG. 2b, and a hollow portion 22 bounded by side rails 16, 17 and cross rail 21. Disk 11 is shown in FIG. 2a comprising a magnetic recording layer 11c carried on a suitable substrate 11d.

Figure 3:
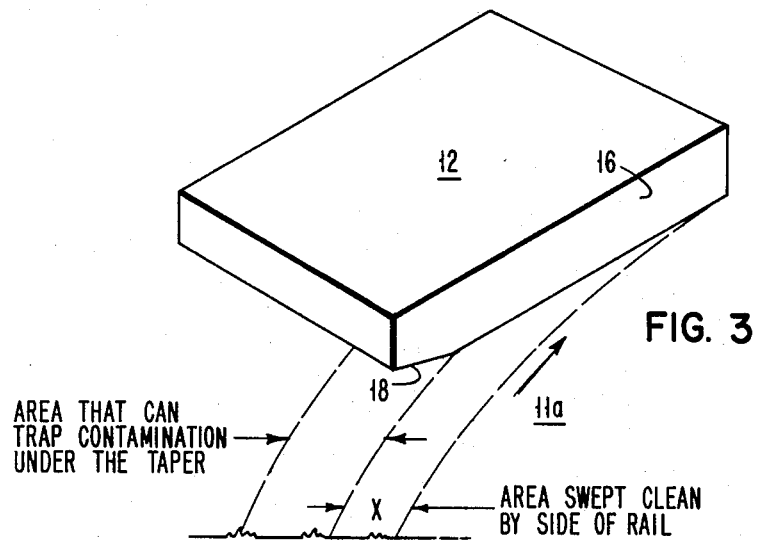

FIG. 3 illustrates the operation of the invention to clean contaminant particles from a disk surface. FIG. 3 illustrates (on a scale which is exaggerated for purposes of clarity) the skew of the leading edge of slider 12 resulting from the fact that the slider trailing edge and active transducer 13 are aligned radially of the center of disk 11. Because of this skew, it can be seen from FIG. 3 that an incremental area of disk surface 11a encounters the side rail 16 before it encounters tapered portion 18. This incremental area, identified as having a width $\chi$ in FIG. 3 and FIG. 4, represents the increments of area which are cleaned of contaminant particles in accordance with the present invention. It will be apparent from FIG. 3 that if access mechanism 14 moves slider 12 radially inward from the disk OD at its normal high speed, some of the contaminant particles carried on disk surface 11a may first encounter tapered portions 18 or 19 and become embedded in surface 11a from the resulting wedging.

However, in accordance with this invention, such embedding is substantially reduced or eliminated by moving access mechanism 14 and slider 12 from the OD to the ID in increments of motion no greater than width $\chi$ and maintaining slider 12 at each incremental position for a sufficient number of rotations of disk surface 11a to ensure cleaning of each incremental area on surface 11a. From FIG. 3, it is clear that if slider 12 is moved radially on disk 11 from OD to ID in increments of motion no larger than $\chi$ and is maintained at each such incremented position for at least one rotation of surface 11a, then each incremental area of surface 11a will first encounter the straight side rail 16 and be swept clear of any contaminant particles by contact of such particles with rail 16. That is, the entire disk surface will be effectively cleaned of debris by side rail 16 so that such debris does not encounter tapered portions 18, 19 of slider 12.

A number of tests were conducted to test the efficacy of the present technique.

An HDA with 16 mechanically good disk surfaces labeled 1-16 was purposely contaminated with 12$\mu$ Al$_2$O$_3$ particles. This amount of contamination, although several orders of magnitude worse than is experienced with the current HDAs was located in a small 1 cm$^2$ area. All moving head surfaces were contaminated except those against the servo arms, surfaces 3, 4, 11 and 12. The heads that were used were standard current data and servo sliders as shown in the above-identified U.S. Pat. No. 3,855,625.

The complete HDA was then mounted in a drive having an A actuator and a B actuator and fitted with a "star-box", a programmable servo system controller which was used to drive the A actuator. The A and B actuators were unlocked and the following "cleaning" sequence was run on the A actuator:

From the OD crash stop position, the actuator moved to track 0, the outermost track, without going into the data zones. Then on track zero and all subsequent tracks, the actuator (i) track-followed for 100 msec on track, (the period of revolution is 16 msec),
(ii) moved ½ track inward and track-followed for 40 msecs,
(iii) returned to the nominal track,
(iv) did a single track access toward the ID and repeated (i).

When the inner guard band was reached near the ID, the actuator re-zeroed to the OD and the sequence was repeated two times to account for a total of 300 msec spent track-following on each track. If the slider had impressed any defect into the disk, this is ample time to scratch the trailing edge alumina of the slider.

This is an implementation of the invention for the A actuator. The B actuator did not follow the cleaning sequence of actuation. After the A actuator was locked, the B actuator did 10 re-zeros, from outer guard band to inner guard band back to outer guard band, each taking on the order of one second. Starting then at track zero, the B actuator repeatedly track-followed for 300 msec and did a single-track-access until it reached the inner guard band. After a re-zero, the actuator was locked and the HDA was taken apart for inspection and testing.

Should either actuator have heads that trap debris and cause fixed defects in the disk, it is known that one effect is that the heads become scratched on a pitch equal to the track spacing. The results of inspection and testing are summarized below:

| A Actuator (with cleaning) | B Actuator (without cleaning) |
| --- | --- |
| 1. of the 6 OD heads and 6 ID heads, only 2 OD heads had any scratches and these had only 2 centrally located scratches. This usually indicates that air born contamination has become trapped. Thus debris initially stuck to the disk was cleaned by the actuation sequence. | All 4 OD heads had severe scratching (more than 30 scratches each). ID heads had less, 1 or 2 sets of scratches extending from the inside edge of the rail. This indicates that debris loosely stuck to the disk was embedded by the head during the actuation sequence. |
| 2. Several disk surfaces serviced by the A-actuator were re-glide-height-tested. No new defects were seen in the area cleaned by the head. | The surfaces associated with the OD heads showed more new glide height defects (20) than did the ID portions of the disk (6). The source of the ID/OD differences is unclear, but they are still significantly worse than the A actuator. This also shows that scratching underestimates the effectiveness of the cleaning. |
| 3. Randomly positioned single scratches were observed on the heads of the A actuator. The worst head (OD on surface 1) had 20. 12 were found on all the remaining heads. Re-glide height testing of this disk showed defects outside the cleaned area where the heads flew with the actuator locked. This area was not cleaned by the actuating sequence. | The scratching was so severe that it was impossible to discern random scratches from track pitch scratches on the OD heads. |
| 4. The servo head (an OD head) had no new scratches. | The servo head had no new scratches. Thus, cross contamination from the A to the B actuator was probably not a |

| A Actuator (with cleaning) | B Actuator (without cleaning) |
|---|---|
| | problem. |

This data illustrates the effectiveness of this cleaning technique in removing loosely stuck debris.

We claim:

1. A method of cleaning contaminants from the magnetic recording surface of a rotating magnetic disk having recording tracks therein with an air bearing magnetic slider of the type comprising a tapered leading portion that is joined to a non-tapered longitudinally extending side rail having a magnetic transducer mounted on its trailing edge, said method comprising the steps of:

positioning said slider closely adjacent said recording surface with said transducer substantially radially aligned with said disk, and with the leading edge of said leading portion slightly skewed relative to the center of the disk and slightly farther away from the center of the disk than said trailing edge, moving said slider in a radial direction while maintaining said transducer radially aligned with said surface, such radial movement being incremental and halted after each increment of movement for a period of time at least equal to the time of one revolution of said disk surface, said increments not exceeding a distance X, and the point at which said tapered leading portion joins said side rail being offset outwardly from the center of said disk said distance X relative to said trailing edge, the rate of such incremental movement being slow enough in relation to the rotational velocity of said disk as to insure that the longitudinally extending side of said side rail encounters and dislodges said contaminants from said surface before said contaminants can encounter and become wedged under said tapered leading portion.

2. A method in accordance with claim 1, wherein, during the moving step, the slider is moved inward in a radial direction over the outermost track to the innermost track.

3. A method in accordance with claim 1, in which said disk is rotating at 3600 RPM and said radial movement is incremental and is halted after each increment of motion for at least 100 milliseconds.

* * * * *